(12) United States Patent
Westra et al.

(10) Patent No.: US 7,027,790 B2
(45) Date of Patent: Apr. 11, 2006

(54) TRANSCEIVER FRONT-END

(75) Inventors: Jan R. Westra, Amstelveen (NL);
Rudy J. van de Plassche, Waalre (NL);
Chi-Hung Lin, Houton (NL)

(73) Assignee: Broadcom Corporation, Irvine, CA (US)

( * ) Notice: Subject to any disclaimer, the term of this patent is extended or adjusted under 35 U.S.C. 154(b) by 770 days.

(21) Appl. No.: 09/925,312

(22) Filed: Aug. 10, 2001

(65) Prior Publication Data

US 2003/0032394 A1    Feb. 13, 2003

(51) Int. Cl.
*H04B 1/06* (2006.01)

(52) U.S. Cl. ............... 455/250.1; 455/78; 455/570; 370/282; 375/257; 343/704; 333/149; 379/388.02; 330/51

(58) Field of Classification Search ........... 455/83, 455/78–80, 82–84, 570, 232.1–297; 370/282; 375/257, 350, 346; 343/704; 333/101, 100, 333/149; 379/388.02; 330/259, 51; 704/225; 381/1; 324/212

See application file for complete search history.

(56) References Cited

U.S. PATENT DOCUMENTS

| 4,246,582 | A |   | 1/1981  | Kondo et al. |
| 4,527,014 | A | * | 7/1985  | Styrna ............... 379/388.02 |
| 5,146,504 | A | * | 9/1992  | Pinckley ............ 704/225 |
| 5,204,854 | A |   | 4/1993  | Gregorian et al. |
| 5,231,408 | A | * | 7/1993  | Nakase ............... 343/704 |
| 5,367,540 | A | * | 11/1994 | Kakuishi et al. ...... 375/350 |
| 5,379,338 | A | * | 1/1995  | Umemoto et al. ...... 455/570 |
| 5,479,503 | A |   | 12/1995 | Fujiwara |
| 5,633,863 | A |   | 5/1997  | Gysel et al. |
| 6,163,579 | A |   | 12/2000 | Harrington et al. |
| 6,259,745 | B1|   | 7/2001  | Chan et al. ........... 375/285 |
| 6,667,614 | B1| * | 12/2003 | McMahon et al. ...... 324/212 |
| 6,720,829 | B1| * | 4/2004  | Matsuyoshi et al. .... 330/149 |
| 6,744,831 | B1| * | 6/2004  | Chan ................. 375/346 |
| 2004/0160272 | A1 | * | 8/2004 | Behzad ............... 330/51 |
| 2004/0247132 | A1 | * | 12/2004 | Klayman et al. ...... 381/1 |

FOREIGN PATENT DOCUMENTS

| EP | 0 691 753 A1 | 1/1996 |
| JP | 05121907 A * | 5/1993 |
| WO | WO 00/39986 A1 | 7/2000 |

OTHER PUBLICATIONS

Copy of European Search Report from European Appl. No. 02255525.4, 3 pages (dated Nov. 28, 2003).
U.S. Appl. No. 09/712,422 filed Nov. 2000, Behzad et al.

* cited by examiner

*Primary Examiner*—Fan Tsang
*Assistant Examiner*—Md S. Elahee
(74) *Attorney, Agent, or Firm*—Sterne, Kessler, Goldstein & Fox P.L.L.C.

(57) ABSTRACT

A transceiver front-end provides an interface between a transmission medium and transmitter, and between a transmission medium and receiver. The transceiver front-end includes a hybrid circuit, a high-pass filter, and a gain stage, that permits the reduction or the complete elimination of buffer amplifiers. Buffer amplifiers can be eliminated because the hybrid circuit and/or the high-pass filter are adapted so that they can be directly connected to each other, without a loss in circuit performance. Furthermore, the high-pass filter and/or the gain stage are also adapted so they can be directly connected. As such, the transceiver front-end can be constructed using all passive components, reducing or eliminating excess heat generation.

26 Claims, 10 Drawing Sheets

TRANSCEIVER FRONT-END

BACKGROUND OF THE INVENTION

1. Field of the Invention

The present invention is generally related to a front-end circuit for a transceiver, and more specifically to a low-power transceiver front-end that can be implemented on a single substrate without the need for buffer amplifiers.

2. Background Art

Electronic communication systems include transmitter and receiver circuits. In many communication systems, transmitters and receivers are present in every node of the system and are often combined to form what is called a transceiver.

A transceiver front-end is a circuit that interfaces a transmission medium with both the receiver and transmitter of a transceiver. Exemplary transmission mediums include a cable, optical fiber, antenna, etc.

There are typically two input signals to the transceiver front-end, a receive signal and a transmit signal. The receive input signal comes from the transmission medium and is intended for the receiver portion of the transceiver. The transmit input signal comes from the transmitter and is intended to exit the transceiver to a transmission medium. Therefore, the transceiver front-end is necessarily a three-port device, where a first port connects to the transmission medium, a second port connects to the receiver, and a third port connects to the transmitter. It is important that the receiver port is sufficiently isolated from the transmitter port, so that the transmit signal is not an input to the receiver.

A conventional transceiver front-end has some known limitations. For example, the typical front-end will have one or more buffer amplifiers to provide amplification and/or isolation between front-end components. Each buffer amplifier consumes power and generates unwanted heat that should be removed from the substrate. Furthermore, it is often desirable to integrate multiple transceivers onto a single substrate to increase integration. When multiple transceivers are integrated on a single substrate, it is critical to make each transceiver as low-power as possible to prevent the need for a blower or heat sink on the chip.

Furthermore, buffer amplifiers are active devices that generate added noise that can degrade overall system noise figure. At the front-end, the added noise is especially detrimental to the overall system noise figure.

Still further, it is necessary that the buffer amplifiers have sufficient dynamic range to cope with input signals having widely varying amplitudes so as to prevent signal distortion. The dynamic range requirement can complicate the buffer amplifier design and the design of the transceiver front-end. More specifically, more power is required to limit signal distortion.

In summary, the elimination of buffer amplifiers will not only save power, heat sinks, blowers, and chip area, but will also relax the noise and distortion requirements of the other circuits in the chain. A preferred transceiver front-end would use as few buffer amplifiers as possible for these mentioned reasons.

What is needed is a scalable transceiver front-end that permits the reduction or elimination of buffer amplifiers, resulting in signal processing that uses close to zero power and has very low distortion and noise.

BRIEF SUMMARY OF THE INVENTION

The present invention is a transceiver front-end having a hybrid circuit, a high-pass filter, and a gain stage, that permits the reduction or the complete elimination of buffer amplifiers. Buffer amplifiers can be eliminated because the hybrid circuit and/or the high-pass filter are adapted so that they can be directly connected to each other, without a loss in performance. Furthermore, the high-pass filter and/or the gain stage are also adapted so they can be directly connected.

The hybrid circuit has three ports: a first port connected to a transmission medium, a second port connected to a transmitter, and a third connected to the high-pass filter, the high-pass filter representing the start of a receiver chain. The hybrid circuit includes a series resistance, which is greater than the transmission medium impedance, but significantly less than the input impedance of the receiver chain in one embodiment. The hybrid circuit also includes two current sources: a transmit signal current source and a replica current source. The transmit current source receives digital transmit data and converts it to an analog current for transmission over the transmission medium. The replica current source replicates the transmit signal current so as to cancel the transmit signal current at the third port, preventing the transmit signal from becoming an input to the receiver chain. In embodiments, the hybrid series resistance is chosen so that the amplitude of the replica current can be scaled by a scaling factor relative to a corresponding amplitude of the transmit signal. In embodiments, each current source is a digital-to-analog converter (DAC). The hybrid circuit described herein substantially isolates the third port from the transmit data, regardless of the input impedance of the high-pass filter.

In embodiments, the high-pass filter has a tunable corner frequency and includes a series capacitor and a resistance. The tunable corner frequency may be tuned using a variable resistance, and the variable resistance can be accomplished through one or more resistors in parallel, each resistor in series with a switch controlled by an individual control signal. The tunable corner frequency can be adjusted by selecting the switches to be closed. In a differential configuration, each switch can be connected to a virtual ground so as not to disturb the receive signal. Alternatively, in a single-ended configuration, each switch can be connected to a real ground.

In embodiments, the gain stage is programmable and has a substantially constant input impedance over frequency and attenuation. The programmable gain stage includes a resistor ladder having multiple taps, each tap having a corresponding switch connected to the output of the programmable gain stage. The attenuation is varied by changing which switch is connected to the output of the programmable gain stage. The attenuation increases longer the signal is allowed to travel through the resistor ladder before being tapped-off. The gain stage also includes one or more parallel resistors connected from the resistor ladder to a virtual ground. The parallel resistors provide for approximately logarithmic steps in attenuation. The ratio between the series and the parallel resistors along the resistor ladder determines the attenuation step size. For example, in one embodiment, the ratio is determined so that attenuation is adjusted in steps of 0.25 dB.

The elimination of buffer amplifiers enables completely passive signal processing from an input to the transceiver front-end to the first stage of the receiver, using nearly zero power. Furthermore, a passive transceiver front-end eliminates the need for an external power source, and therefore does not generate excess heat that would need to be removed by a heat sink or fan. Still further, passive signal processing adds less distortion and noise to the receive signal than active signal processing.

Further features and advantages of the present invention, as well as the structure and operation of various embodiments of the present invention, are described in detail below with reference to the accompanying drawings.

BRIEF DESCRIPTION OF THE DRAWINGS/FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

1. Example Transceiver Application

Before describing the invention in detail, it is useful to describe an example communications environment for the invention. The front-end invention is not limited to the communications environment that is described herein, as the transceiver front-end circuitry is applicable to other communications and non-communications applications as will be understood to those skilled in the relevant arts based on the discussions given herein.

Figure 1:
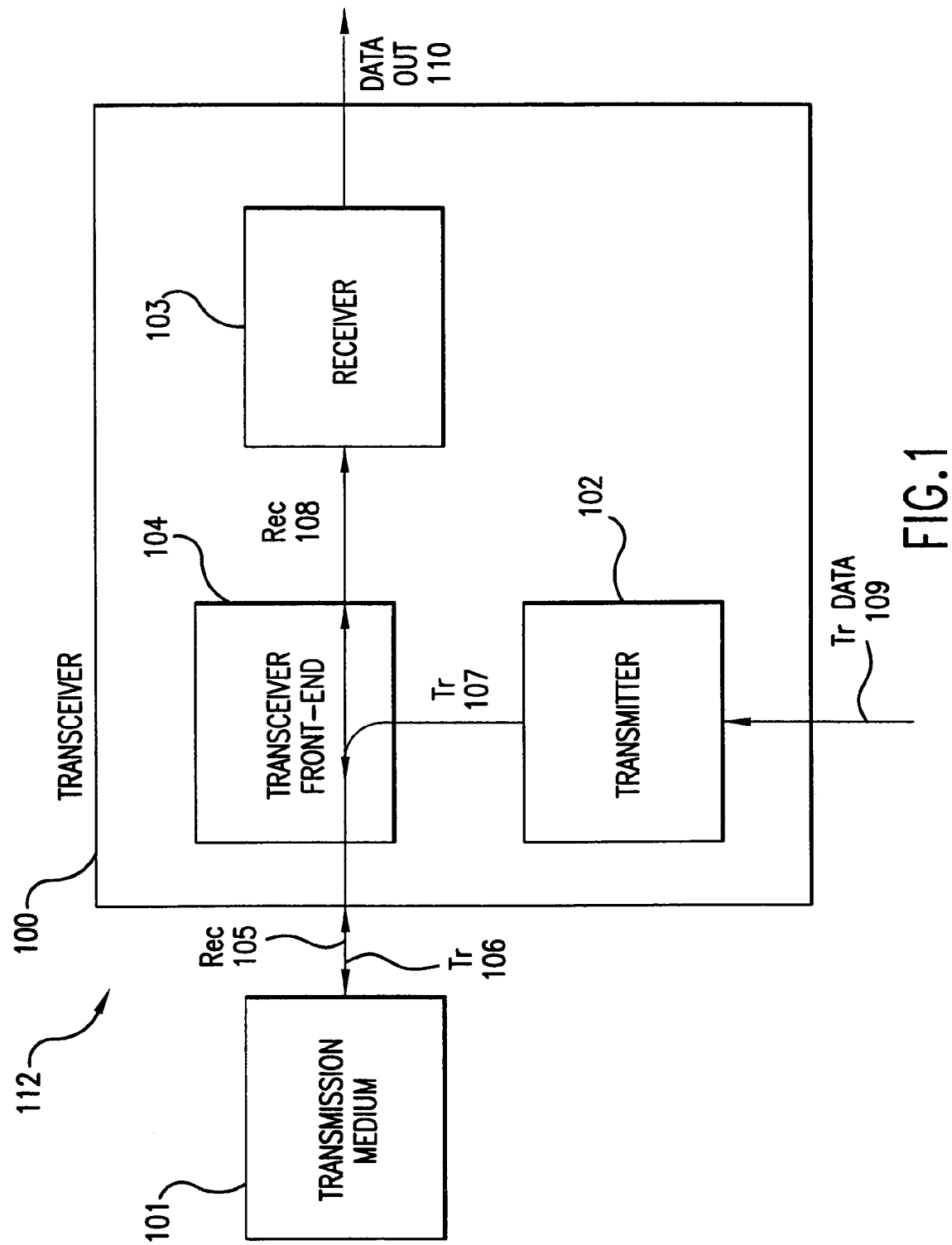
FIG. 1 illustrates an exemplary communications environment including a transceiver front-end.

FIG. 1 illustrates a communications environment 112 having a transmission medium 101 and a transceiver 100. The transceiver 100 includes at least a transmitter 102, a receiver 103, and a transceiver front-end 104. The transmission medium 101 transfers communications signals (e.g. voice and/or data) to and from the transceiver 100. Exemplary types of the transmission media 101 include a cable, an optical fiber, public airways, or any other medium capable of carrying communications signals. The operation of the transceiver 100 is further described as follows.

For data transmission over medium 101, transmit data 109 is received by the transmitter 102 and is processed for transmission over the medium 101. For example, the transmitter 102 can modulate the transmit data 109 to generate a transmit signal 107 that is output to the transceiver front end 104. The transceiver front-end 104 then passes a transmit signal 106 to the medium 101 for transmission, where the transmit signal 106 is a representation of the transmit signal 107. Preferably, the transmit signal 106 is little changed from the transmit signal 107.

During receive, a receive signal 105 is received by the transceiver front-end 104 and is passed to the receiver 103 as a receive signal 108. Preferably, the receive signal 108 is little changed from the receive signal 105. The receiver 103 processes the receive signal 108 to generate a data output signal 110, which can be further processed as desired.

Based on the above discussion, it is apparent that the transceiver front-end 104 acts as an interface between the transmission medium 101 and the transmitter 102, and between the transmission medium 101 and the receiver 103. One purpose of the transceiver front-end 104 is to distinguish between the receive signal 105 and the transmit signal 107 so as not to allow transmit signal 107 to enter the receiver 103. Instead, the transmit signal 107 is only to exit the transceiver front-end 104 (as the transmit signal 106) and enter the transmission medium 101. This prevents the transmit signal 107 from saturating the receiver 103, or otherwise distorting the data output signal 110.

2. Conventional Transceiver Front-End

Figure 2:
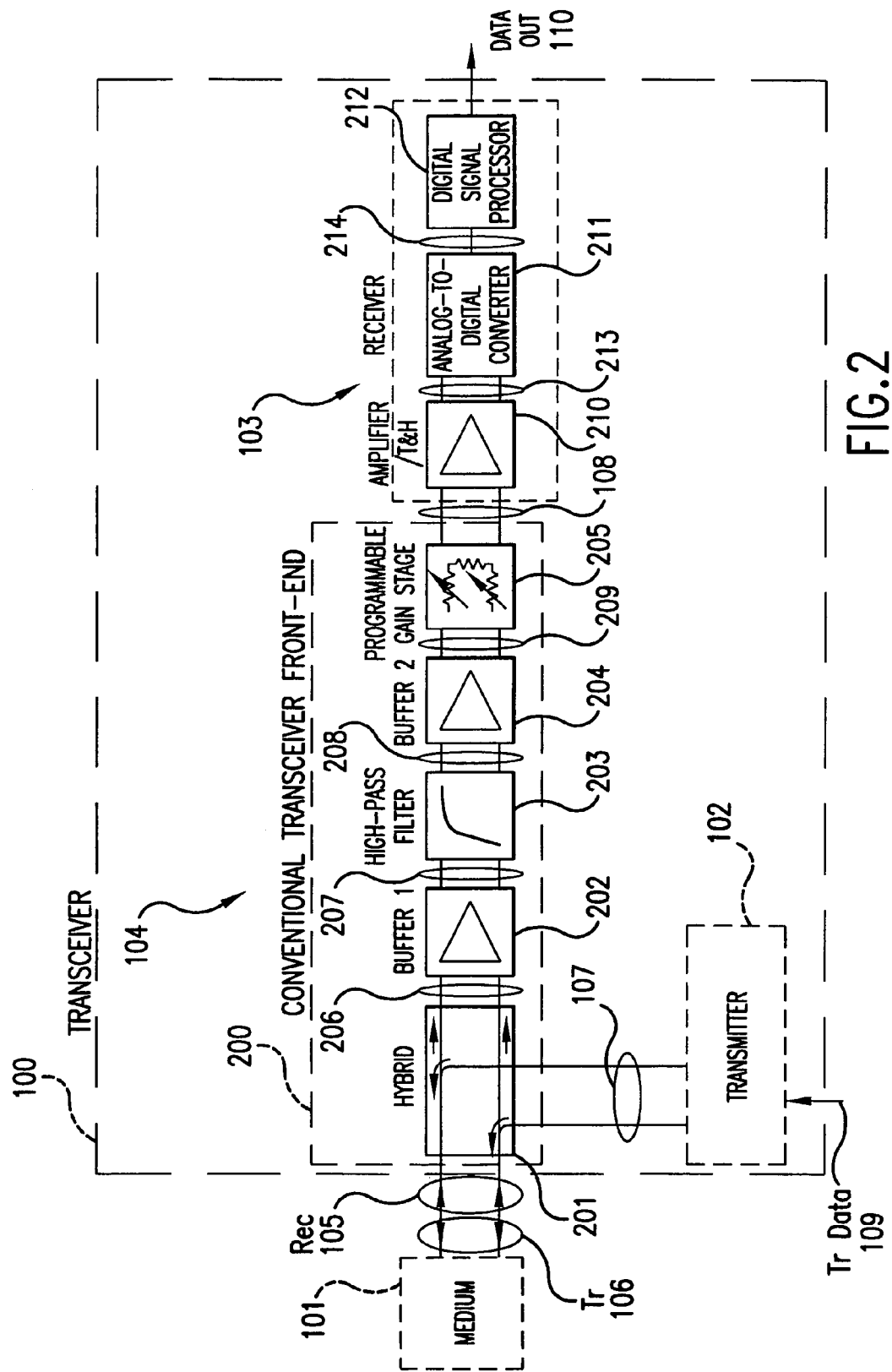
FIG. 2 illustrates a conventional transceiver front-end within a communications environment.

FIG. 2 illustrates a conventional transceiver front-end 200. A conventional transceiver front-end 200 includes a hybrid circuit 201, a first buffer amplifier 202, a high-pass filter 203, a second buffer amplifier 204, and a programmable gain stage 205 (also known as a programmable gain amplifier, programmable gain attenuator, or PGA).

The hybrid circuit 201 receives the receive signal 105 from the transmission medium 101 and the transmit signal 107 from the transmitter 102. The hybrid circuit 201 prevents the transmit signal 107 from entering the buffer 202 in order to prevent the transmit signal 107 from ultimately entering the receiver 103. The output transmit signal 106 is passed from the hybrid circuit 201 to the bidirectional transmission medium 101 through a port in the hybrid circuit 201. Preferably, the transmit signal 106 is little changed from the transmit signal 107 that is received from the transmitter 102. The output receive signal 206 is passed from the hybrid circuit 201 to the first buffer 202 through another port in the hybrid circuit 201. Preferably, the output receive signal 206 is little changed from the receive signal 105.

The first buffer 202 receives the receive signal 206 from the hybrid circuit 201 and amplifies the receive signal 206 to generate a receive signal 207. The first buffer amplifier 202 outputs the amplified receive signal 207 to the input of the high-pass filter 203.

The high-pass filter 203 receives the amplified receive signal 207 from the first buffer 202. The high-pass filter 203 removes low-frequency signals below a cutoff (or corner) frequency. These undesired low frequency signals are out of band and carry no useful information, but could otherwise saturate the rest of the receiver 215 if these low frequency signals were not sufficiently rejected. The high-pass filter 203 outputs the filtered receive signal 208 to the input of the second buffer 204.

The second buffer 204 receives filtered receive signal 208 from the high pass filter 203 and amplifies the signal 208 to generate an amplified receive signal 209. The second buffer amplifier 204 outputs the amplified receive signal 209 to the input of the programmable gain stage 205.

The programmable gain stage 205 receives the amplified receive signal 209 from the second buffer 204. The programmable gain stage 205 amplifies or attenuates the amplified receive signal 209 such that the signal is scaled to fit the dynamic range of the subsequent signal processing blocks of the receiver 103. The programmable gain stage 205 outputs the receive signal 108 to the input of the receiver 103.

In addition to providing signal amplification, the buffer amplifiers 202 and 204 also provide isolation between the remaining components in the front-end 200. For instance, the buffer 202 isolates the input impedance of the high-pass filter 203 from the receiver output 206 of the hybrid 201. Without this isolation, the ability of the conventional hybrid 201 to isolate the transmit signal 107 from the receive signal 206 could be compromised. Furthermore, insufficient isolation can also cause substantial attenuation of the receive signal. Likewise, the buffer 204 isolates the input impedance of the programmable gain stage 205 from the high-pass filter 203. The isolation of the PGA prevents the input impedance of the programmable gain stage 205 from changing the cutoff (or corner) frequency of the high-pass filter 203.

The receiver 103 receives the input signal 108 at an amplifier (or track and hold circuit) 210. The amplifier 210 amplifies the input signal 108 and outputs an amplified signal 213 to an analog-to-digital converter 211. The analog-to-digital converter 211 converts the analog amplified signal 213 to a digital signal 214. The digital signal 214 is then passed from the output of the analog-to-digital converter 211 to the input of a digital signal processor (DSP) 212. The digital signal processor 212 performs various processing functions on the digital signal 214 to generate data output 110. The processing functions performed by the DSP 212 are known and can include for example, digital filtering, demodulation, error checking and correction, etc. The data output 110 can be further processed by subsequent components (not shown).

As described above, buffer amplifiers used in a transceiver, although useful for their buffering function, have some disadvantages. For instance, each buffer amplifier consumes power and chip area, and generates heat that should be removed by a heat sink or fan. Furthermore, each buffer amplifier adds noise and distortion to the signal. Therefore, the elimination of buffer amplifiers will not only save power, heat sinks, blowers, and chip area, but will also relax the noise and distortion requirements of the other circuits in the receiver chain. The present invention accomplishes this with a completely passive front-end circuit that is buffer-less, low-power, low-noise, and has low-distortion.

3. Transceiver Front-End Description

Figure 3:
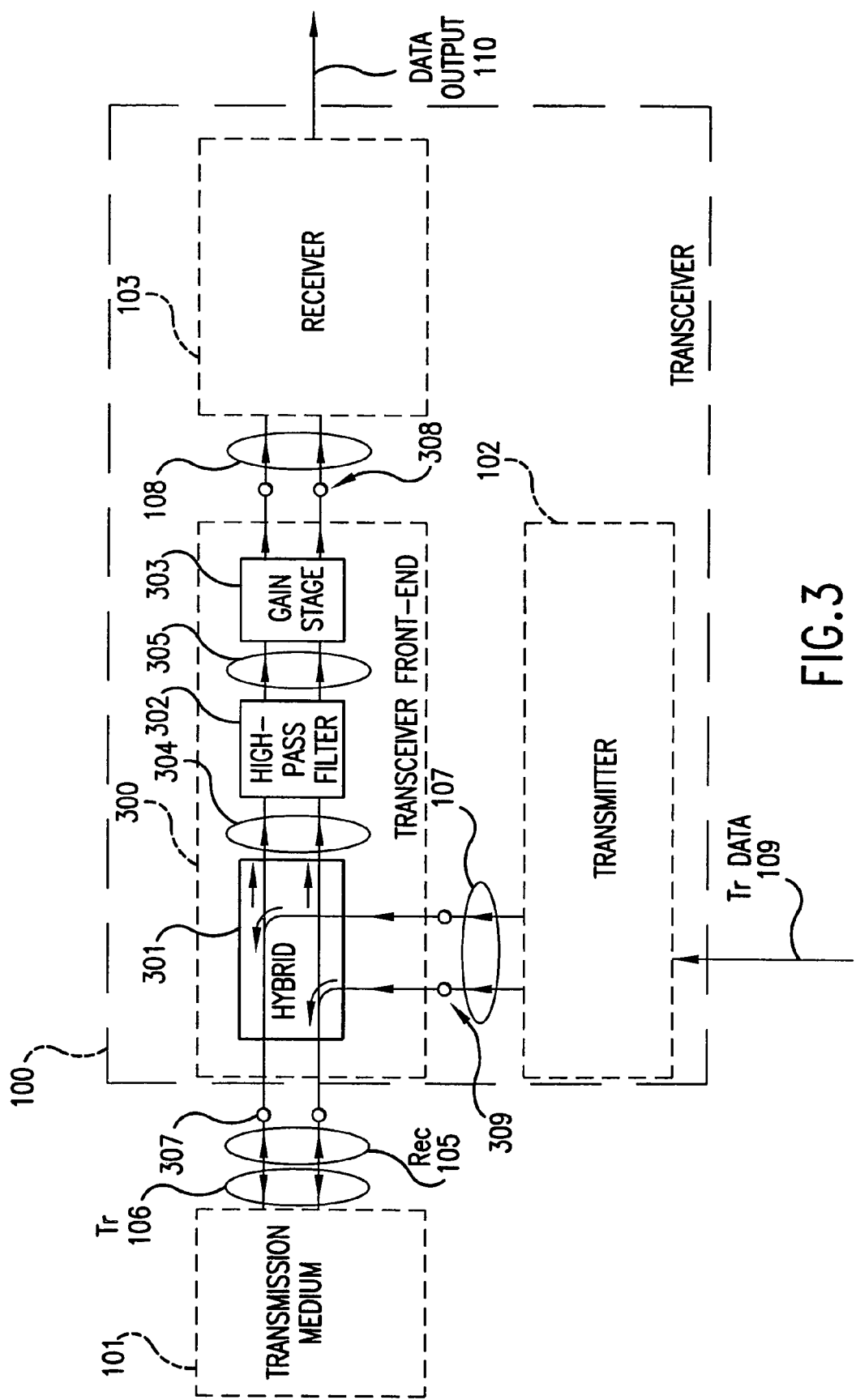
FIG. 3 illustrates a transceiver front-end, according to embodiments of the invention.

FIG. 3 illustrates a transceiver front-end 300 according to embodiments of the present invention. The transceiver front-end 300 includes a hybrid circuit 301, a high-pass filter 302, and a gain stage 303. As in the conventional transceiver shown in FIG. 2, there are three ports in the front-end 300. Namely, a first port 307 is connected to the transmission medium 101, a second port 309 is connected to the transmitter 102, and a third port 308 is connected to the receiver 103. The first and second ports 307 and 309 are connected to the hybrid circuit 301 as shown, and the third port is an output of the gain stage 303, as shown.

The embodiments of the present invention are shown in the figures as differential circuits. Although differential systems are the preferred implementation, all embodiments of the present invention can be implemented as single-ended systems.

During operation of the transceiver 300, the hybrid circuit 301 receives the receive signal 105 from the transmission medium 101 and also receives the transmit signal 107 from the transmitter 102. The hybrid circuit 301 passes the transmit signal 106 directly to the transmission medium 101, where the transmit signal 106 is a close representation to the transmit signal 107. Preferably, the transmit signal 106 is little changed from the transmit signal 107. The hybrid circuit 301 prevents the transmit signal 107 from entering the high-pass filter 302 in order to prevent the transmit signal 107 from ultimately entering the receiver 103, which could result in undesired signal distortion. The hybrid circuit 301 passes a receive signal 304, which is a representation of the receive signal 105, directly to the high-pass filter 302. Preferably, the receive signal 304 is little changed from the receive signal 105.

The high-pass filter 302 receives the receive signal 304 and filters the receive signal 304 to remove low frequency components below the cutoff (or corner frequency) of the high-pass filter 302. These undesired low frequency signals are out-of-band and carry no useful information, but could otherwise cause distortion in the receive signal if the low frequency energy is not sufficiently rejected. The high-pass filter 302 outputs the filtered receive signal 305 directly to the input of the programmable gain stage 303.

The programmable gain stage 303 can be either active or passive, where the latter embodiment is a programmable attenuator. The programmable gain stage 303 amplifies or attenuates the filtered receive signal 305 so that the receive signal 108 is scaled to fit the dynamic range of the subsequent signal processing blocks of the receiver 103. The programmable gain stage 303 outputs the receive signal 108 directly to the input of the receiver 103.

In contrast to the conventional front-end 200, the front-end 300 is configured so that the hybrid 301 is directly connected to the high-pass filter 302. Furthermore, the high-pass 302 is directly connected to the gain stage 303 in the front-end 300. This is possible because the components in the transceiver front-end 300 are adapted so that there is no need for the buffer amplifiers between the components. In other words, the hybrid 301 is adapted so that there is no need for a buffer amplifier to isolate the hybrid 301 from the high-pass filter 302. Furthermore, there is no need for a buffer amplifier to isolate the gain stage 303 from the high pass filter 302.

The absence of buffer amplifiers in the front-end 300 means that the receive chain of the front-end 300 can be a completely passive device, if the gain stage is chosen to be passive. This results in a number of advantages. Namely, the front-end 300 does not require an external power supply and accordingly, does not require devices for heat removal. As such, the transceiver front-end 300 can be replicated multiple times and integrated on a single substrate without requiring a heat sink, fan, or other heat removal device.

4. The Hybrid Circuit

Figure 4:
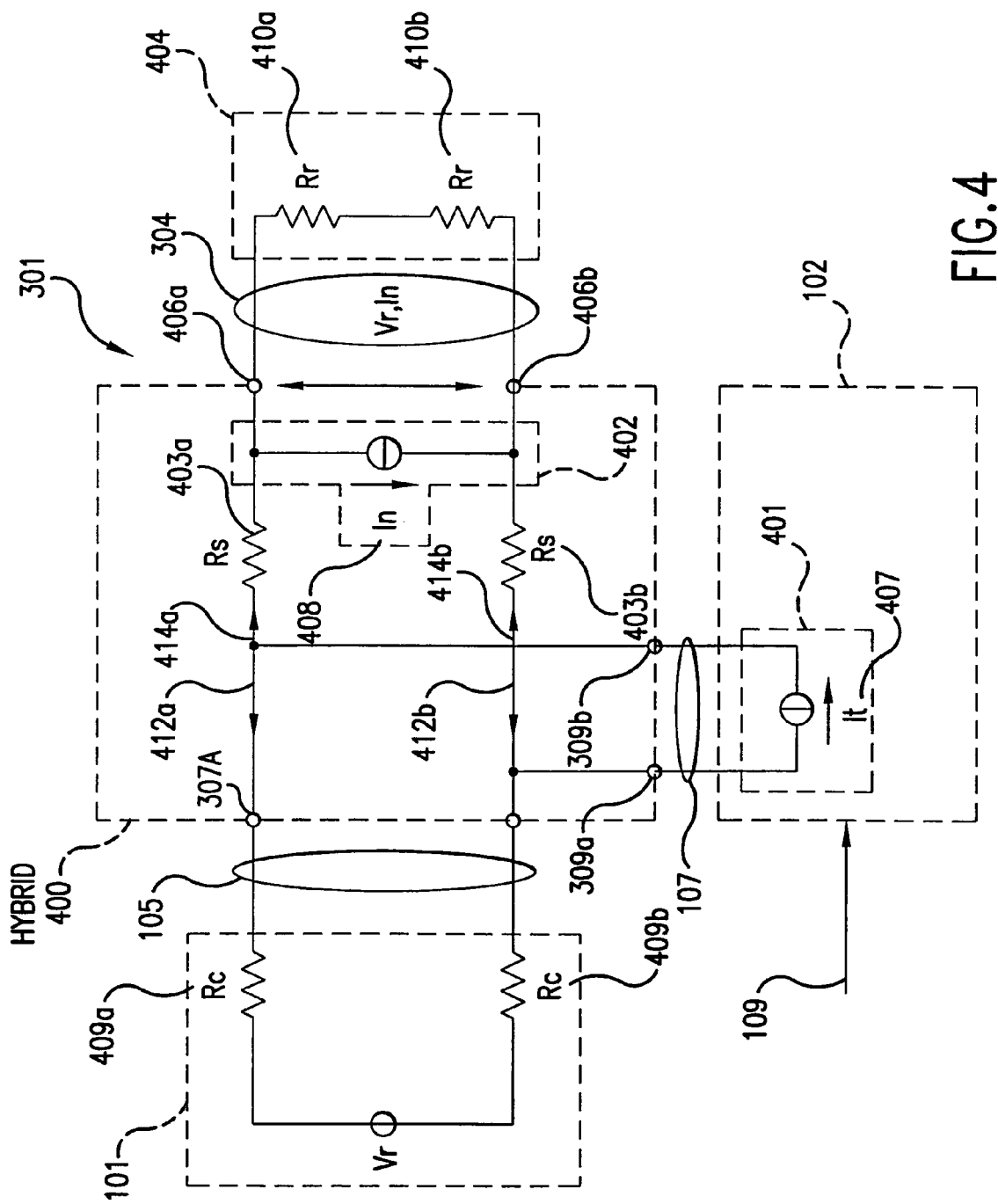
FIG. 4 illustrates a hybrid circuit, according to embodiments of the invention.

FIG. 4 illustrates a hybrid circuit 400, which is one embodiment of the hybrid circuit 301. The hybrid circuit 400 includes a replica circuit 402 and series resistors 403a,b. FIG. 4 further illustrates the representative impedances connected to the hybrid 400. For instance, resistors 409a,b represent the characteristic impedance of the medium 101. Resistors 410a,b represent the input impedance seen at port 406a,b, which is the input impedance of the high-pass filter 302. Finally, FIG. 4 also illustrates the transmitter 102 having a transmit signal generator 401 that is coupled to the port 307a,b.

It is noted that FIG. 4 (as well as FIG. 3, and FIGS. 5–9) are configured for differential operation. Accordingly, the a,b designation on the reference numbers represents the positive and negative components related to differential operation. Going forward, the a,b designation is not generally discussed in the text for the sake of brevity. Furthermore, those skilled in the arts will recognize that this invention is not limited to differential configurations, and could be implemented using single-ended configurations.

As discussed above, one function of the hybrid circuit 301 (and therefore the hybrid 400) is to isolate the transmit data 107 from the high-pass filter 302, and ultimately the receiver 103. As described in detail below, the hybrid circuit 400 accomplishes this by replicating the transmit signal and using the replicated transmit signal to cancel transmit signal at the receive output port of the hybrid circuit 400. The operation of the hybrid circuit 400 is described in further detail as follows.

The transmit signal generator 401 receives the transmit data 109 that carries information to be transmitted over the medium 101. The transmit signal generator 401 converts the transmit data 109 into a current 407 (also shown in FIG. 4 as $I_t$) that represents the transmit signal 107 in FIG. 1 as is shown. The current 407 is applied across the port 307 that is connected to the medium 101. A first portion 412 of the current 407 flows out the port 307, to produce the transmit signal 106 that is transmitted over the medium 101. A second portion 414 of the current 407 flows to the receiver port 406 through the resistors 403, where the resistor 403 can be sized so the current 412 is larger than the current 414. In other words, most of the current 407 flows out the port 307 to the medium 101, instead of to the port 406. The replica current source 402 creates a replica current 408 (also shown in FIG. 4 as $I_n$) that cancels the current portion 414 at the port 406 to prevent the current 414 from entering the high-pass filter 302. More specifically, the signal associated with the replica current 408 is 180 degrees out-of-phase and has an amplitude that is scaled relative to the transmit signal current 407 so as to cancel the current 414 at the port 406. Only a scaled version is needed to cancel the current 414 because most of the current 407 flows out the port 307 to the medium 101.

Using a scaled current 408 for transmit signal cancellation reduces power consumption compared to a non-scaled configuration. In other words, it is desirable that the transmit signal current 407 be a large signal and that the canceling replica current 408 be a relatively small signal because the replica current 408 does not get transmitted over the medium 101, and therefore does not contribute to the transmit signal power.

The relationship among the impedance 409 of the transmission medium 101 (also shown in FIG. 4 as $R_c$) and the series resistance 403 (also shown in FIG. 4 as $R_s$) allows for the scaled current version to be used successfully to cancel the transmit signal at the port 406. Cancellation of the transmitted signal at the hybrid output port 406 is complete when, according to the following equation:

$$I_n = \frac{R_c}{(R_c + R_s)} I_t \qquad \text{Eq. (1)}$$

where, $R_c$ is the characteristic impedance 409 of the transmission medium 101;

$R_s$ is the series-resistance 403 of the hybrid 400.

From this equation, it can be seen that cancellation of the transmitted signal 107 does not depend on the absolute value of the receiver input impedance (i.e. the impedance $R_r$ 410), but only depends on the ratio between the cable impedance $R_c$ and the series resistance $R_s$ of the hybrid 400. Therefore, a low receiver input impedance only affects the receive gain of the front-end 300, and does not affect the cancellation of the transmit signal in the hybrid 301 (or 401).

For receive in FIG. 4, the receive signal 105 is received at the port 307, and is passed through the series impedance 403 to the receive output port 406, to produce the receive signal 304. The amplitude of the receive signal 304 (shown in FIG. 4 as $V_{r,in}$) at the hybrid port 406 can be calculated according to the equation below as:

$$V_{r,in} = \frac{R_r}{(R_r + R_c + R_s)} V_r \qquad \text{Eq. (2)}$$

where, $R_c$ is the characteristic impedance 409 of the transmission medium 101;

$R_r$ is the characteristic impedance 410 at the input of the high-pass filter 302;

$R_S$ is the series-resistance 403 of the hybrid 400; and $V_r$ is the amplitude of the signal that is the source for the receive signal 105.

Referring to Equation 2, the transfer (gain) of the hybrid input signal 105 to the hybrid output signal 304 can be close to one (i.e. no gain), as long as $R_c$ and $R_s$ are small compared to $R_r$. The relationship among the impedances is ideal when $R_s$ is greater than $R_c$ and $R_r$ is substantially greater than $R_s$. However, even if $R_r$ is not large, according to Eq. 1, a low input impedance at the hybrid port 406 ($R_r$) only affects the gain of the transceiver front-end and not the cancellation of the transmitted signal in the hybrid 400. The gain stage 303 (FIG. 3) can correct for the somewhat lower gain when required.

Figure 5:
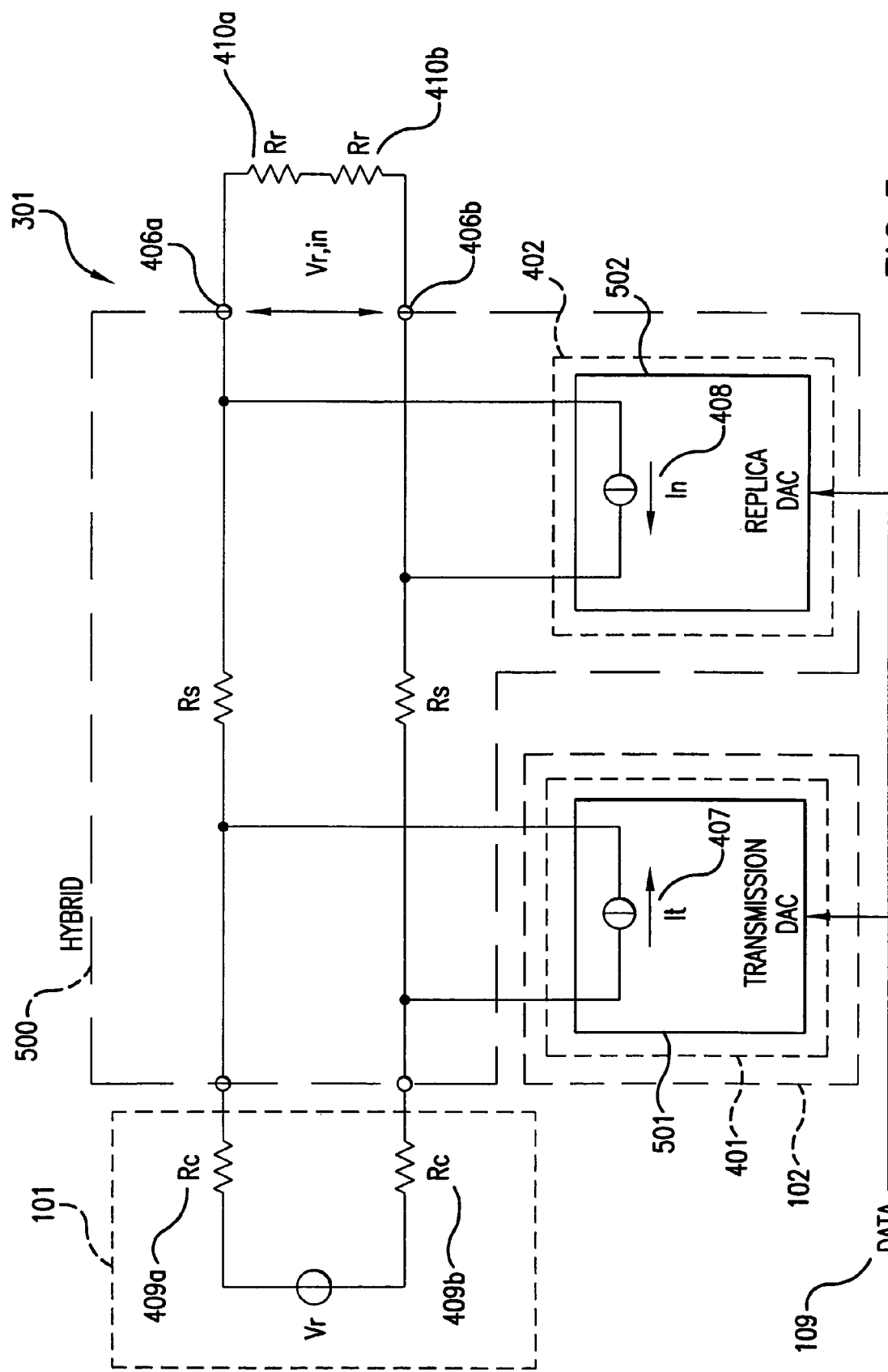
FIG. 5 illustrates a hybrid circuit using digital-to-analog converters for signal cancellation, according to embodiments of the invention.

FIG. 5 illustrates another hybrid circuit 500, according to an embodiment of the invention. It is substantially the same circuit as depicted in FIG. 4, however, the transmit signal generator 401 and the replica current source 402 are each digital-to-analog converters (DAC), that are controlled by the same transmit data signal 107. More specifically, the transmit signal generator 401 is a transmit DAC 501 that generates the transmit current 407 based on the transmit data 107. The replica circuit 402 is a replica DAC 502 that generates the replica analog current 408, where the analog output 408 is approximately 180 degrees out of phase with the transmit signal current 407 in order to cancel the current 407 at the port 406. As discussed above, the amplitude of the current 408 is determined so that it is scaled relative to the amplitude of the current 407.

The overall effect of using either the hybrid circuits 400 or 500 is the creation of an environment where the hybrid circuit is relatively insensitive to the input impedance 410 (FIG. 4) of the high-pass filter 302 (FIG. 3), such that the use of a first buffer (202 in FIG. 2) just after the hybrid can be eliminated.

The hybrid 500 is further described in U.S. Pat. No. 6,259,745 B1, issued Jul. 10, 2001, which is incorporated herein by reference in its entirety.

In addition to the embodiments in FIG. 5, the transmit signal generator 401 and the replica current generator 402 could be any type of digitally controlled signal source, including a digitally controlled current source, or a digitally controlled voltage source. Additionally, the transmit signal generator 401 and the replica signal generator 402 could also be an analog controlled signal source, such as an analog controlled current source or an analog controlled voltage source.

5. The High-Pass Filter

Figure 6:
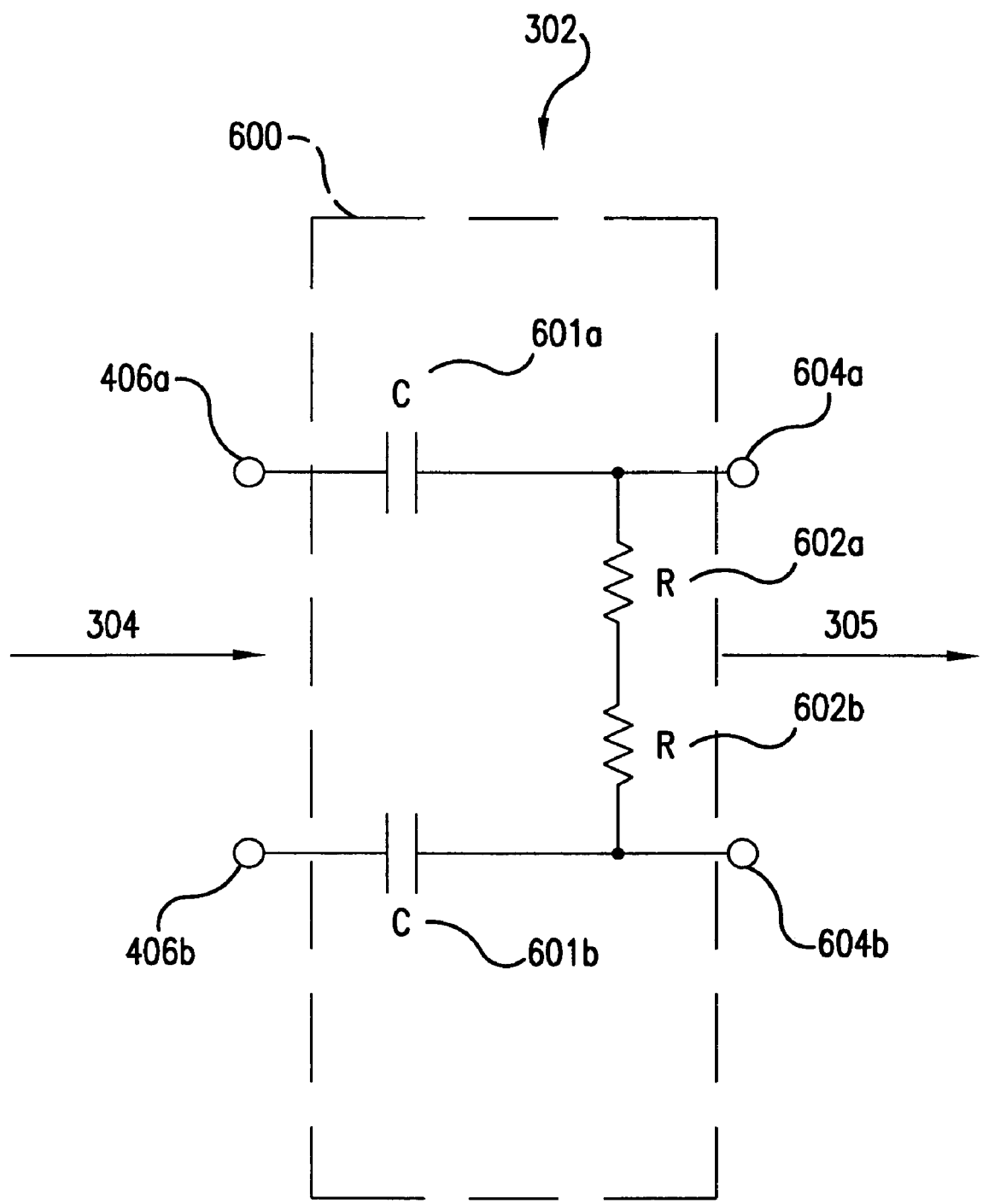
FIG. 6 illustrates a high-pass filter, according to embodiments of the invention.

FIG. 6 illustrates a high-pass filter 600, which is one embodiment of the high-pass filter 302. The high-pass filter 600 includes a capacitor 601 connected in-series with a resistor 602. The corner (or cutoff frequency) of the high-pass filter 600 is determined by the following equation:

$$f_c = 1/(2 \cdot \pi RC) \quad \text{Eq. (3)}$$

Based on equation 3, the corner frequency $f_c$ of the high-pass filter 600 can be tuned by changing the values of either the series capacitor 601 or the resistor 602.

Figure 7:
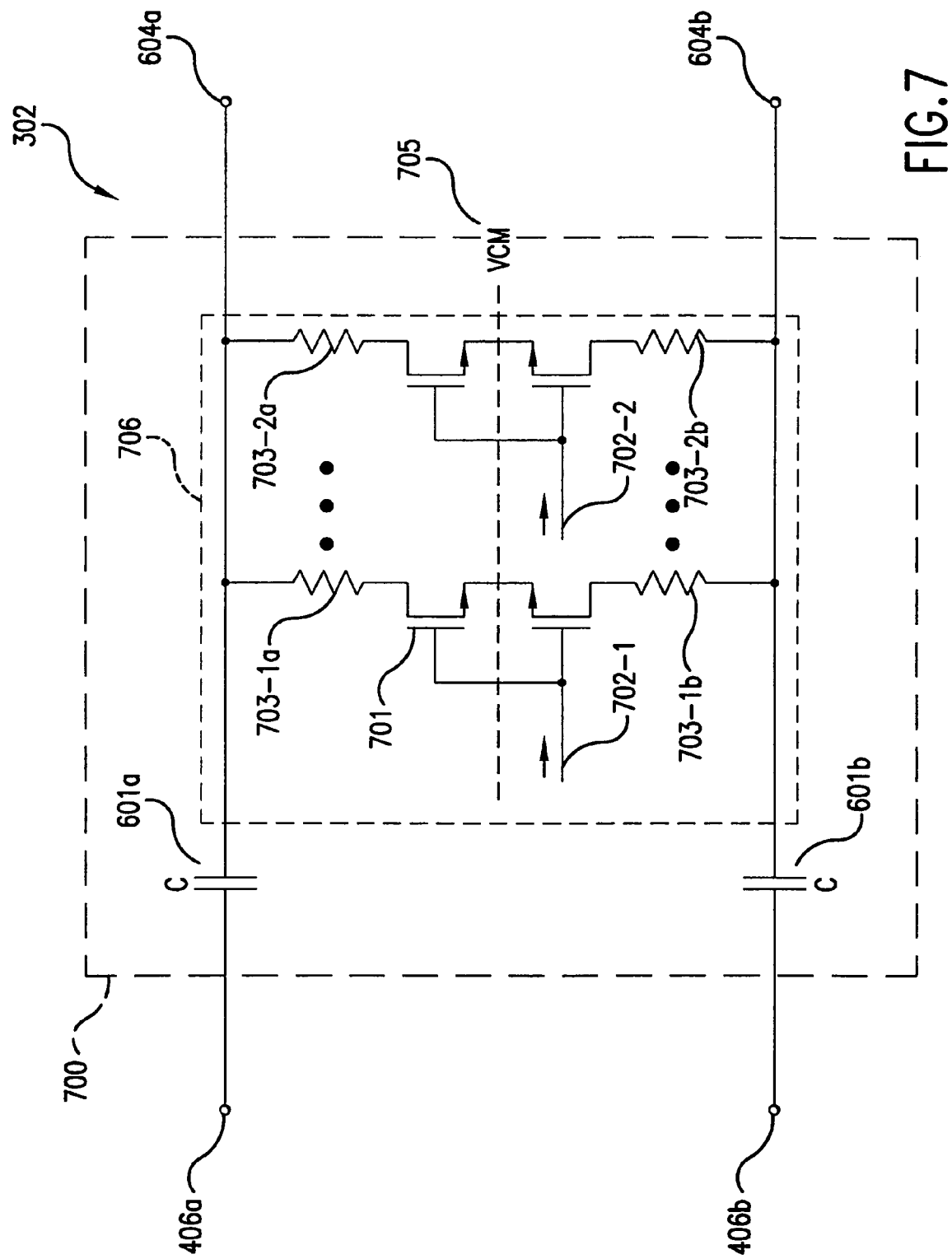
FIG. 7 illustrates a tunable high-pass filter using variable resistors, according to embodiments of the invention.

FIG. 7 illustrates another embodiment 700 of the high-pass filter 302, where the resistor 602 is replaced with a variable resistance 706. The resistance 706 includes one or more pairs of resistors 703-1 to 703-$n$. For example, resistor pair 703-1 includes resistors 703-1$a$ and 703-1$b$. Resistor pair 703-2 includes resistors 703-2$a$ and 703-2$b$. Each resistor pair 703 is arranged in-parallel with the other resistor pairs 703. For example, resistor pair 703-1 is arranged in parallel with resistor pair 703-2. Furthermore, each resistor pair 703 can be switched-in or switched-out of the variable resistor 706 using switches, such as MOS transistors 701, to more finely tune the high-pass corner frequency. The switches 701 are each controlled by a corresponding control signal 702, as shown. In order to adjust the high-pass corner frequency, resistor pairs 703 are added or subtracted by controlling the switches 701 with the appropriate control signal 702. For example, when a pair of resistors 703 is switched-in to the variable resistor 706, the effective resistance at the high-pass filter output port 604 becomes lower, and therefore the high-pass corner frequency becomes higher. One elegant aspect of this embodiment is that the switches 701 are connected to a virtual ground 705, which does not conduct any signal so as not to add to the distortion of the system.

Figure 8:
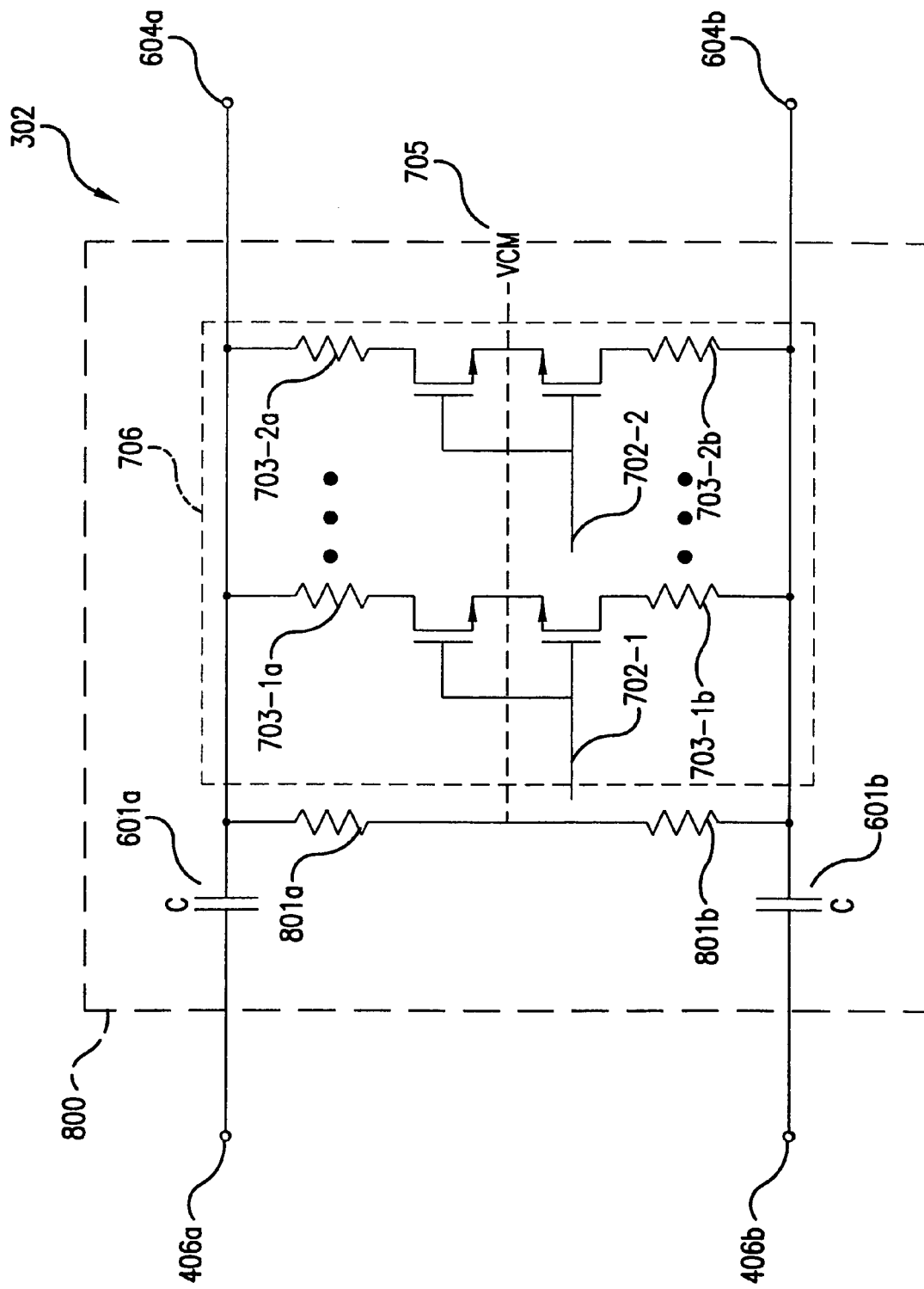
FIG. 8 illustrates a tunable high-pass filter using a fixed resistor as well as variable resistors, according to embodiments of the invention.

In a further embodiment of the high-pass filter, shown as 800 in FIG. 8, it may be desirable to include a fixed resistor 801 in parallel with the switchable resistors of FIG. 7 to increase the high-pass corner frequency, providing more design flexibility.

6. The Gain Stage

Figure 9:
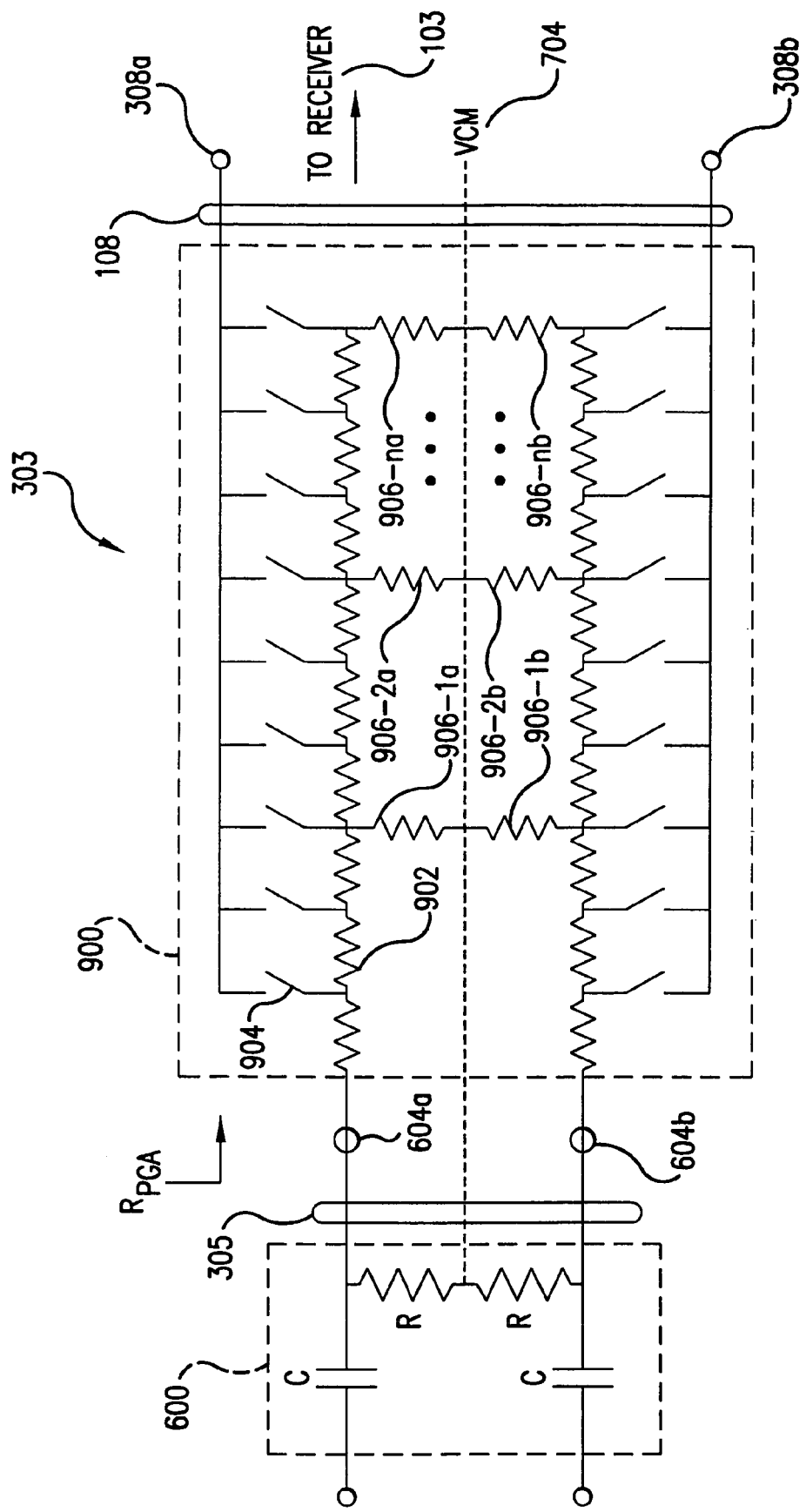
FIG. 9 illustrates a gain stage, according to embodiments of the invention.

FIG. 9 illustrates a programmable gain stage 900, which is one embodiment of the gain stage 303 in FIG. 3. The programmable gain stage 900 includes a resistor ladder 902 having multiple taps 904 that tap off the resistor ladder to the output ports 308. Additionally, the programmable gain stage 900 also includes multiple resistors 906-1 through 906-$n$ that are periodically placed along the resistor ladder 902 and connect from the resistor ladder 902 to the virtual ground 704. The resistors 906 provide for approximately logarithmic steps in attenuation, as opposed to the linear relationship that would occur without the resistors 906. In other words, the resistors 906 allow for the attenuation to be varied approximately linearly in db, which is logarithmic in absolute terms. The dB step in attenuation is determined by the ratio between the series resistance 902, between the taps 904, and the parallel resistance 906. For example, in one embodiment, the resistance ratio is set so that the attenuation is varied in steps of 0.25 dB.

During operation, the receive signal 305 is directly incident at the port 604 that connects to the resistor ladder 902. The signal 305 is attenuated by the resistor ladder 902 until it is tapped-off by at least one closed switch 904 to the output port 308, to produce the output receive signal 108. The longer the signal 305 travels through the resistor ladder 902, the more attenuated the output signal 108. The attenuation is tuned by changing the switch 904 that is closed, where the attenuation is logarithmically stepped as discussed above.

Since the programmable gain stage 900 is directly connected to the output of the high-pass filter 302, the input impedance of the gain stage 900 is in-parallel with the resistance of the high-pass filter 302 and affects the high-pass corner frequency $f_c$ of the high-pass filter 302. Therefore, it is desirable that the input impedance of the gain stage 900 be substantially constant over frequency, and over attenuation steps. The gain stage 900 provides the desired constant input impedance because the input impedance is substantially determined by the resistors 902 and 906, regardless of which switch 904 is closed. In other words, the input impedance of the programmable gain stage 900 is substantially constant over frequency and over different attenuation settings. This constant input impedance of the programmable gain stage 900 alleviates the need for a buffer amplifier between the high-pass filter and the programmable gain stage 900. Furthermore, the constant input impedance of the programmable gain stage 900 can be further used to replace (or augment) the parallel resistors 602, 703, or 801 in the high-pass filters 600, 700, or 800, respectively. In one embodiment, the input impedance of the programmable gain stage 900 substantially determines the corner frequency of the high-pass filter 700, and the resistors 703 are added (or subtracted) to further tune the corner frequency.

The programmable gain stage 900 is illustrated as a passive device. This is preferable for low power configurations since a passive device does not require a power supply, and therefore does not generate excess heat that would require heat removal. Furthermore, a passive device does not add distortion to the receive signal as an active device would. However, in alternate embodiment, an active programmable gain stage is used to produce actual signal gain (as opposed to attenuation), as will be understood by those skilled in the arts.

As described, the gain stage 900 is programmable. However, a constant gain stage can be utilized. A constant gain stage can be configured by permanently closing a switch 904, and not changing it.

The gain stage 900 is further described in co-pending application Ser. No. 09/712,422, entitled, "Gigabit Ethernet Transreceiver with Analog Front End", filed Nov. 13, 2000, which is incorporated by reference herein in its entirety.

7. Summary

Figure 10:
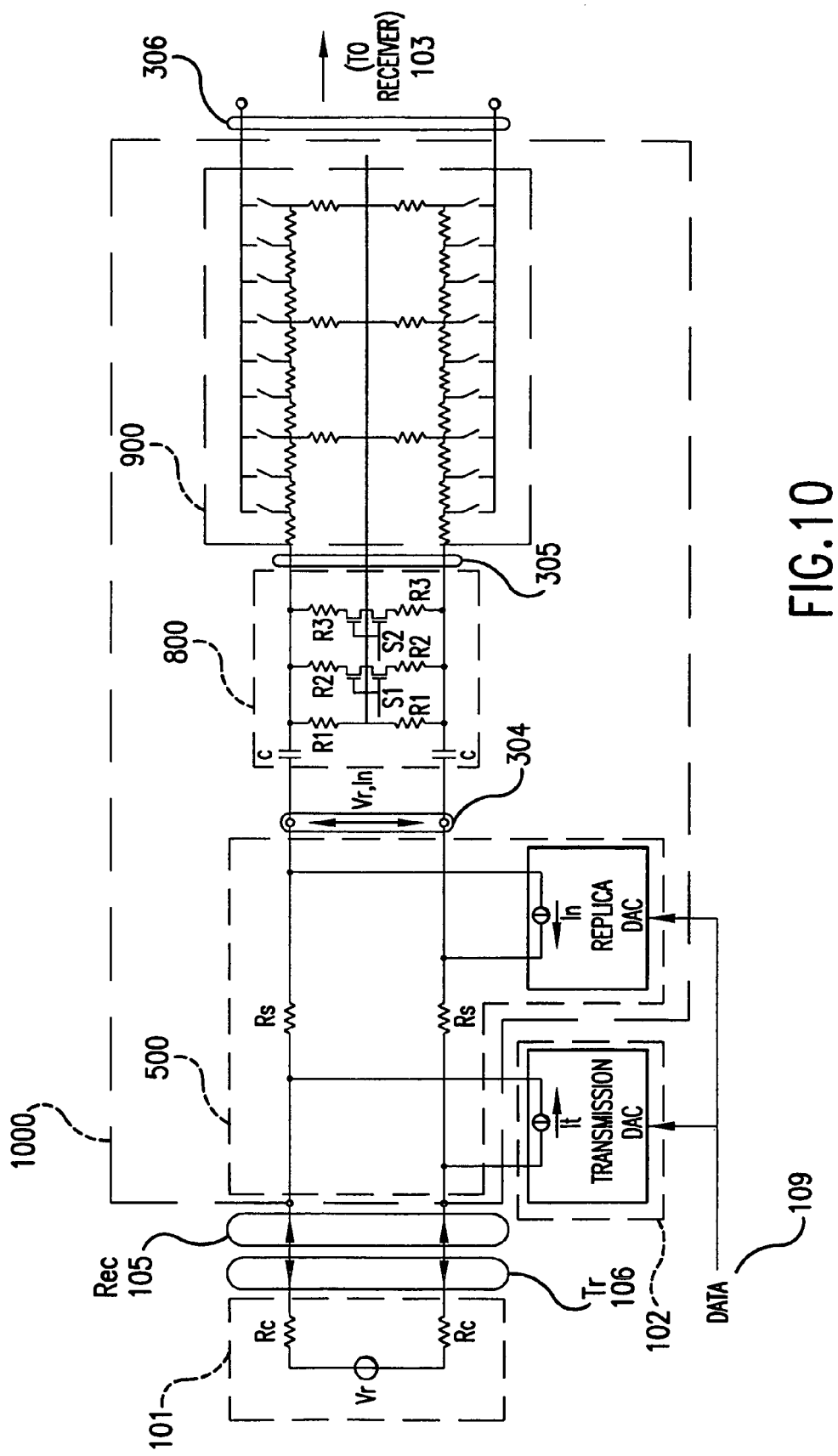
FIG. 10 illustrates a transceiver front-end, according to embodiments of the present invention.

The present invention described herein is a transceiver front-end consisting of a hybrid circuit, a high-pass filter, and a gain stage, that are directly connected together permitting the reduction or elimination of buffer amplifiers. This enables complete passive signal processing from an input of the transceiver front-end to the first stage of the receiver, using nearly zero power. Additionally, the transceiver front-end, being made up of passive devices only, has a very low noise figure and very low distortion. FIG. 10 illustrates one embodiment 1000 of the transceiver front-end invention using one example of each circuit element described herein. Referring to FIG. 10, the hybrid 500 is directly connected to the high-pass filter 800, without an intervening buffer amplifier. Furthermore, the high-pass filter 800 is directly connected to the programmable gain stage 900 without an intervening buffer amplifier.

8. Other Applications

The transceiver front-end invention described herein has been discussed in reference to a communications environment. However, the transceiver front-end circuit itself is not limited to communications systems, and is applicable to other non-communications applications that would benefit from a low-power, low-noise, and low-distortion design when processing electronic signals. The application of the transceiver front-end invention to these non-communications applications will be understood by those skilled in the relevant arts based on the discussions given herein, and are within the scope and spirit of the present invention.

9. Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A transceiver front-end, comprising:
a hybrid circuit having a first port that is connectable to a transmission medium, a second port that is connectable to a transmit source, and a third port, said hybrid circuit including a series resistance connected between said first port of said hybrid and said third port of said hybrid;
a high-pass filter, having an input that is directly connected to said third port of said hybrid circuit; and
a gain stage, having an input that is connected to an output of said high-pass filter;
wherein said series resistance is greater than a characteristic impedance of said transmission medium.

2. The transceiver front-end of claim 1, wherein said input of said gain stage is directly connected to said output of said high-pass filter.

3. The transceiver front-end of claim 1, said hybrid circuit comprising:
a replica circuit that replicates a transmit signal generated from said transmit source to produce a replica transmit signal that substantially cancels said transmit signal at said third port of said hybrid.

4. The transceiver front-end of claim 3, wherein said replica transmit signal is substantially 180 degrees out of phase with said transmit signal.

5. The transceiver front-end of claim 3, wherein said replica circuit comprises a digital-to-analog converter (DAC) that receives transmit data and generates said replica transmit signal.

6. The transceiver front-end of claim 1, wherein said series resistance is substantially less than an input impedance of said high-pass filter.

7. The transceiver front-end of claim 1, wherein said high-pass filter has a tunable corner frequency.

8. The transceiver front-end of claim 1, wherein at least one of said hybrid circuit, said high-pass filter, and said gain stage is differential.

9. The transceiver front-end of claim 1, wherein each of said hybrid circuit, said high-pass filter, and said gain stage are differential.

10. The transceiver front-end of claim 1, wherein said gain stage has a constant input impedance.

11. The transceiver front-end of claim 1, wherein said hybrid circuit, said high-pass filter, and said gain stage are passive.

12. The transceiver front-end of claim 1, wherein said third port of said hybrid circuit is substantially isolated from said transmit source, despite variations in an input impedance of said high pass filter.

13. A transceiver front-end, comprising:
a hybrid circuit having a first port that is connectable to a transmission medium, a second port that is connectable to a transmit source, and a third port;
a high-pass filter, having an input that is directly connected to said third port of said hybrid circuit;
a gain stage, having an input that is connected to an output of said high-pass filter; and
a first digital-to-analog converter (DAC) adapted to receive digital transmit data from said transmit source and having an analog output connected to said first port of said hybrid circuit;
wherein said hybrid circuit comprises a second digital-to-analog converter (DAC) adapted to receive said digital transmit data from said transmit source and having an analog output connected to said third port of said hybrid circuit.

14. The transceiver front-end of claim 13, said analog output of said second DAC being approximately 180 degrees out of phase with said analog output of said first DAC.

15. The transceiver front-end of claim 13, said analog output of said second DAC having an amplitude that is a scaled by a scaling factor relative to a corresponding amplitude for said analog output of said first DAC.

16. The transceiver front-end of claim 15, wherein said scaling factor is:

Rc/(Rc+Rs)

wherein Rc is a characteristic impedance of said transmission medium and Rs is a series resistance of said hybrid circuit.

17. A transceiver front-end, comprising:
a hybrid circuit having a first port that is connectable to a transmission medium, a second port that is connectable to a transmit source, and a third port;
a high-pass filter, having an input that is directly connected to said third port of said hybrid circuit; and
a gain stage, having an input that is connected to an output of said high-pass filter;
wherein said high-pass filter has a tunable corner frequency; and
wherein said high-pass filter includes a variable resistance that determines said tunable corner frequency;
wherein said hybrid circuit includes a series resistance connected between said first port of said hybrid and said third port of said hybrid, said series resistance greater than a characteristic impedance of said transmission medium.

18. The transceiver front-end of claim 17, wherein said variable resistance includes:
a first resistor; and
a second resistor that is series-connected with a switch, said second resistor and said switch connected in parallel with said first resistor, said tunable corner frequency adjusted by closing said switch.

19. A transceiver front-end, comprising:
a hybrid circuit having a first port that is connectable to a transmission medium, a second port that is connectable to a transmit source, and a third port;
a high-pass filter, having an input that is directly connected to said third port of said hybrid circuit; and
a gain stage, having an input that is connected to an output of said high-pass filter;
wherein said gain stage is a programmable gain stage; and
wherein a gain of said programmable gain stage is tunable in logarithmic steps according to a control signal;
wherein said hybrid circuit includes a series resistance connected between said first port of said hybrid and said third port of said hybrid, said series resistance greater than a characteristic impedance of said transmission medium.

20. A transceiver front-end, comprising:
a hybrid circuit having a first port that is connectable to a transmission medium, a second port that is connectable to a transmit source, and a third port;
a high-pass filter, having an input that is directly connected to said third port of said hybrid circuit; and
a gain stage, having an input that is connected to an output of said high-pass filter;
wherein said gain stage is a programmable gain stage including,
a resistor ladder having multiple taps, each tap having a corresponding switch connected to an output of said programmable gain stage; and
one or more parallel resistors connected from said resistor ladder to a virtual ground.

21. A transceiver front-end, comprising:
a differential hybrid circuit having a first port that is connectable to a transmission medium, a second port that is connectable to a transmit source, and a third port;
a differential high-pass filter, having an input that is directly connected to said third port of said hybrid circuit;
a differential programmable gain stage, having an input that is directly connected to an output of said high-pass filter; and
a first digital-to-analog converter (DAC) adapted to receive digital transmit data from said transmit source and having an analog output connected to said first port of said hybrid circuit;
wherein said differential hybrid circuit includes,
a series resistance between said first port and said third port; and
a second digital-to-analog converter (DAC) adapted to receive said digital transmit data from said transmit source and having an analog output connected to said third port of said hybrid circuit, wherein said analog output of said second DAC cancels said analog output from said first DAC at said third port of said hybrid circuit.

22. The transceiver front-end of claim 21, wherein said differential hybrid circuit, said differential high-pass filter, and said differential gain stage are passive.

23. The transceiver front-end of claim 21, wherein said analog output signal of said second DAC is approximately 180 degrees out of phase with said analog output signal from said first DAC.

24. The transceiver front-end of claim 21, said analog output of said second DAC being scaled by a scaling factor relative to said analog output of said first DAC, said scaling factor determined by Rc/(Rc+Rs), wherein Rc is a characteristic impedance of said transmission medium and Rs is a series resistance of said hybrid circuit.

25. A transceiver front-end, comprising:
a differential hybrid circuit having a first port that is connectable to a transmission medium, a second port that is connectable to a transmit source, and a third port;
a differential high-pass filter, having an input that is directly connected to said third port of said hybrid circuit; and
a differential programmable gain stage, having an input that is directly connected to an output of said high-pass filter;
wherein said high-pass filter comprises:
a series capacitor; and
a variable resistance connected in-series with said series capacitor, wherein a corner frequency of said high-pass filter is tuned by adjusting said variable resistance;
wherein said hybrid circuit includes a series resistance connected between said first port of said hybrid and said third port of said hybrid, said series resistance greater than a characteristic impedance of said transmission medium.

26. A transceiver front-end, comprising:
a differential hybrid circuit having a first port that is connectable to a transmission medium, a second port that is connectable to a transmit source, and a third port;
a differential high-pass filter, having an input that is directly connected to said third port of said hybrid circuit; and
a differential programmable gain stage, having an input that is directly connected to an output of said high-pass filter;
wherein said programmable gain stage comprises:
a resistor ladder having multiple taps, each tap having a corresponding switch connected to an output of said programmable gain stage; and
one or more parallel resistors connected from said resistor ladder to a virtual ground.

* * * * *